United States Patent
Matsuoka

(10) Patent No.: US 9,887,600 B2
(45) Date of Patent: Feb. 6, 2018

(54) BRUSHLESS MOTOR AND BRUSHLESS MOTOR MANUFACTURING METHOD

(71) Applicant: TOSHIBA LIFESTYLE PRODUCTS & SERVICES CORPORATION, Tokyo (JP)

(72) Inventor: Tadao Matsuoka, Seto Aichi (JP)

(73) Assignee: TOSHIBA LIFESTYLE PRODUCTS & SERVICES CORPORATION, Tokyo (JP)

( * ) Notice: Subject to any disclaimer, the term of this patent is extended or adjusted under 35 U.S.C. 154(b) by 0 days.

(21) Appl. No.: 15/223,723

(22) Filed: Jul. 29, 2016

(65) Prior Publication Data

US 2017/0033637 A1 Feb. 2, 2017

Related U.S. Application Data

(63) Continuation of application No. PCT/JP2015/000375, filed on Jan. 28, 2015.

(30) Foreign Application Priority Data

Jan. 30, 2014 (JP) .................................. 2014-016060

(51) Int. Cl.
*H02K 3/50* (2006.01)
*H02K 21/18* (2006.01)
(Continued)

(52) U.S. Cl.
CPC ............ *H02K 3/50* (2013.01); *F04D 25/0606* (2013.01); *H02K 1/143* (2013.01); *H02K 3/18* (2013.01);
(Continued)

(58) Field of Classification Search
CPC ...... F04D 25/0606; H02K 1/04; H02K 1/043; H02K 3/18; H02K 3/32; H02K 3/325;
(Continued)

(56) References Cited

U.S. PATENT DOCUMENTS 3,829,720 A * 8/1974 Swanke ................. H02K 1/146
                                                    310/216.115
4,038,573 A * 7/1977 Hillyer .................... H02K 3/522
                                                    310/194
(Continued)

FOREIGN PATENT DOCUMENTS

EP     1 601 080      11/2005
JP     S48-72403      9/1973
(Continued)

OTHER PUBLICATIONS

International Search Report (with English Translation) issued in PCT/JP2015/000375 dated Mar. 24, 2015.
(Continued)

*Primary Examiner* — Bernard Rojas
*Assistant Examiner* — Rashad Johnson
(74) *Attorney, Agent, or Firm* — DLA Piper LLP US

(57) ABSTRACT

A brushless motor comprising:
a rotor; a stator; a position detector; and a controller, wherein the stator includes: a stator core; an insulation body;
a wire of which one end side is wound on one winding target portion and the other end side is wound on the other winding target portion to form one and the other coils generating magnetic poles having different polarities in the one and the other magnetic pole portions of the stator core and of which both end portions are respectively held by a holding portion and an intermediate portion of the one and the other coils is held by an intermediate holding portion;
an intermediate terminal which is attached to the intermediate holding portion to be electrically connected to the wire; and
(Continued)

a terminal portion which is attached to the holding portion to be electrically connected to both end portions of the wire.

2 Claims, 6 Drawing Sheets

(51) Int. Cl.
| | |
|---|---|
| *H02K 29/08* | (2006.01) |
| *H02K 7/14* | (2006.01) |
| *H02K 11/25* | (2016.01) |
| *H02K 1/14* | (2006.01) |
| *H02K 3/52* | (2006.01) |
| *F04D 25/06* | (2006.01) |
| *H02K 3/18* | (2006.01) |

(52) U.S. Cl.
CPC .............. *H02K 3/524* (2013.01); *H02K 7/14* (2013.01); *H02K 11/25* (2016.01); *H02K 21/185* (2013.01); *H02K 29/08* (2013.01)

(58) Field of Classification Search
CPC .......... H02K 3/34; H02K 3/345; H02K 3/524; H02K 7/14
USPC ...... 310/43, 49, 71, 214, 215, 216, 260, 270
See application file for complete search history.

(56) References Cited

U.S. PATENT DOCUMENTS

| | | | | |
|---|---|---|---|---|
| 4,519,010 A | * | 5/1985 | Elsaesser | G11B 17/038 310/268 |
| 4,554,471 A | * | 11/1985 | Bertram | H02K 21/18 310/49.33 |
| 4,801,775 A | * | 1/1989 | Cornell | H01F 30/10 219/702 |
| 4,801,776 A | * | 1/1989 | Cornell | H01F 30/10 219/702 |
| 5,402,028 A | * | 3/1995 | Koeber | H02K 1/143 310/216.009 |
| 5,619,086 A | * | 4/1997 | Steiner | H01F 41/0233 242/437.2 |
| 5,627,424 A | * | 5/1997 | Steiner | H02K 1/141 310/172 |
| 6,534,892 B2 | * | 3/2003 | Braun | D03C 3/20 29/596 |
| 7,116,023 B2 | * | 10/2006 | Wang | H02K 1/148 310/194 |
| 7,382,075 B2 | * | 6/2008 | Wang | H02K 3/522 310/179 |
| 2008/0157610 A1 | * | 7/2008 | Watanabe | H02K 3/522 310/43 |

FOREIGN PATENT DOCUMENTS

| | | |
|---|---|---|
| JP | S54-98909 | 8/1979 |
| JP | S54-137714 | 9/1979 |
| JP | S60-26446 | 2/1985 |
| JP | 2001-258226 | 9/2001 |

OTHER PUBLICATIONS

Written Opinion (with English Translation) issued in PCT/JP2015/000375 dated Mar. 24, 2015.
International Preliminary Report on Patentability issued in PCT/JP2015/000375 dated Aug. 2, 2016.
English Language Abstract of JPS 54-98909 published Aug. 4, 1979.
English Language Abstract and English Language Translation of JP 2001-258226 published Sep. 21, 2001.
English Language Abstract and English Language Translation of JPS 60-26446 published Feb. 9, 1985.
Japanese Notice of Allowance (with English Translation) issued in JP 2014-016060 dated Aug. 9, 2017.
English Language Abstract and Translation of EP 1 601 080 published Nov. 30, 2005.

* cited by examiner

BRUSHLESS MOTOR AND BRUSHLESS MOTOR MANUFACTURING METHOD

CROSS-REFERENCE TO RELATED APPLICATIONS

This application is a continuation of prior International Application No. PCT/JP2015/000375 filed on Jan. 28, 2015, which is based upon and claims the benefit of priority from Japanese Patent Application No. 2014-016060 filed on Jan. 30, 2014, the entire contents of all of which are incorporated herein by reference.

FIELD

An embodiment of the invention relates to a brushless motor and a method which manufactures the brushless motor.

BACKGROUND

Hitherto, a brushless motor used in, for example, an electric blower of a vacuum cleaner includes a rotor which includes a plurality of pairs of magnetic poles provided in an outer circumference, a stator which includes a pair of opposite coils and generates force of rotating the rotor, and a position detector such as a hall IC which detects a rotation position of the rotor. Here, the rotor is rotated in such a manner that a direction in which a current flows to the coils is switched in response to the rotation position of the rotor detected by the position detector.

In such a configuration, when the coils provided in the stator are formed, one end portion of a wire is held by one terminal base, the wire is wound on an insulation body attached to a stator core, the other end portion of the wire is connected to the other terminal base, and the wire is cut. In this way, these operations are repeated.

Thus, since there is a need to process the terminal of the wire whenever the coil is formed, the number of terminal processed portions increases and hence deterioration in reliability occurs.

Alternatively, since the time for cutting and soldering the wire is required, there is a concern for an increase in cost.

DETAILED DESCRIPTION

Hereinafter, a configuration of an embodiment will be described with reference to FIGS. 1 to 6.

Figure 5:
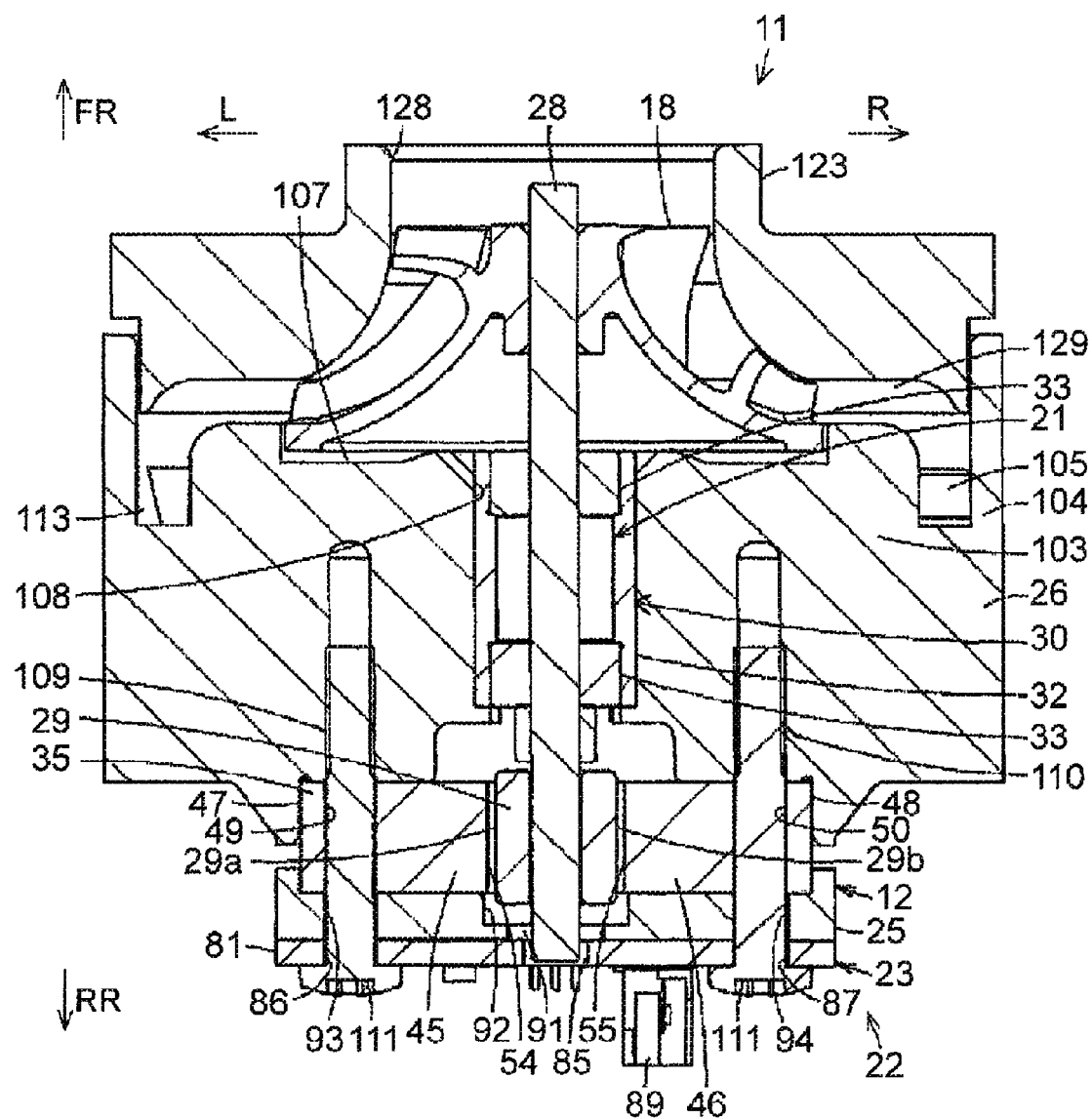
FIG. 5 is a center cross-sectional view illustrating the electric blower.
Figure 6A:
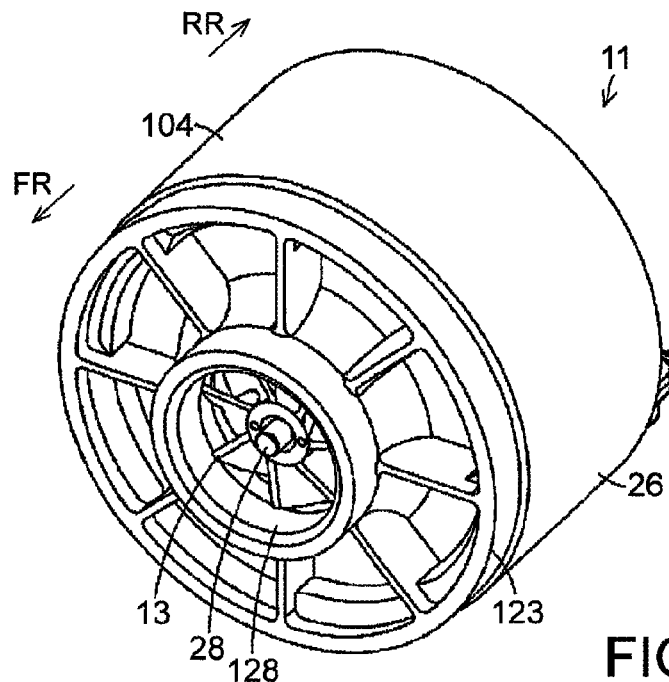
FIG. 6A is a perspective view illustrating the electric blower when viewed from a front side thereof.
Figure 6B:
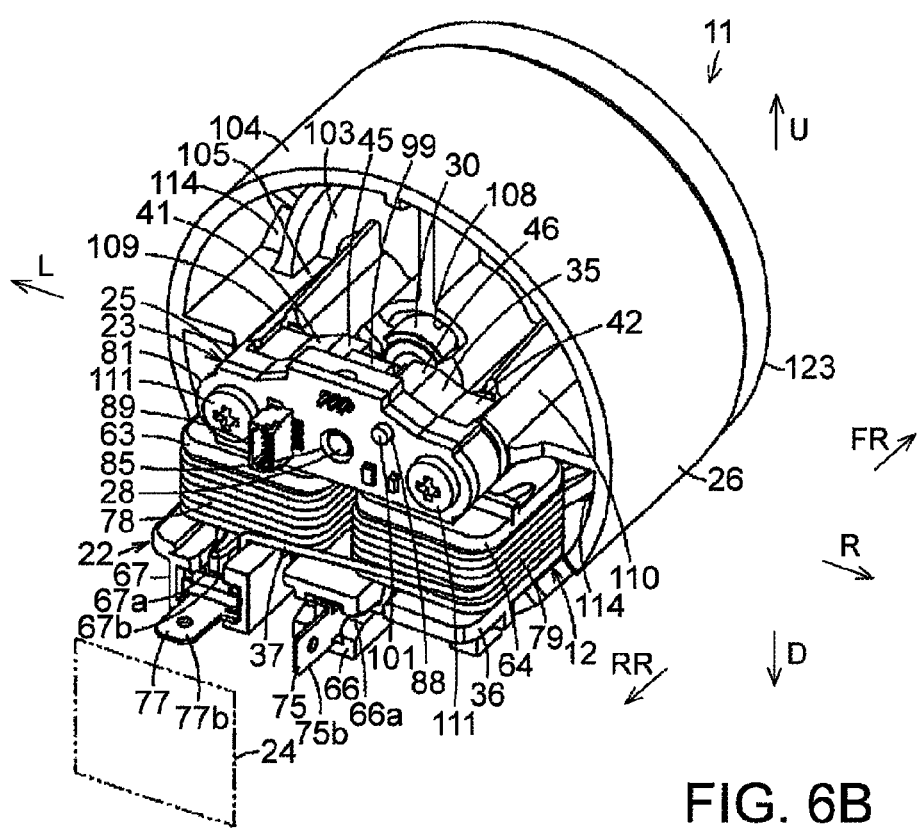
FIG. 6B is a perspective view illustrating the electric blower when viewed from a rear side thereof.

In FIGS. 5, 6A, and 6B, reference numeral 11 denotes an electric blower and the electric blower 11 is used in, for example, a vacuum cleaner or a blower.

The electric blower 11 includes a brushless motor 12 which is an electric motor and a centrifugal fan 13 which is a fan rotated by the brushless motor 12 and the motor and the fan are integrated with each other.

Hereinafter, in order to further clarify a description, a side near the brushless motor 12 of the electric blower 11 will be described as a rear side (a side indicated by an arrow RR) and a side near the centrifugal fan 13 will be described as a front side (a side indicated by an arrow FR).

Figure 4:
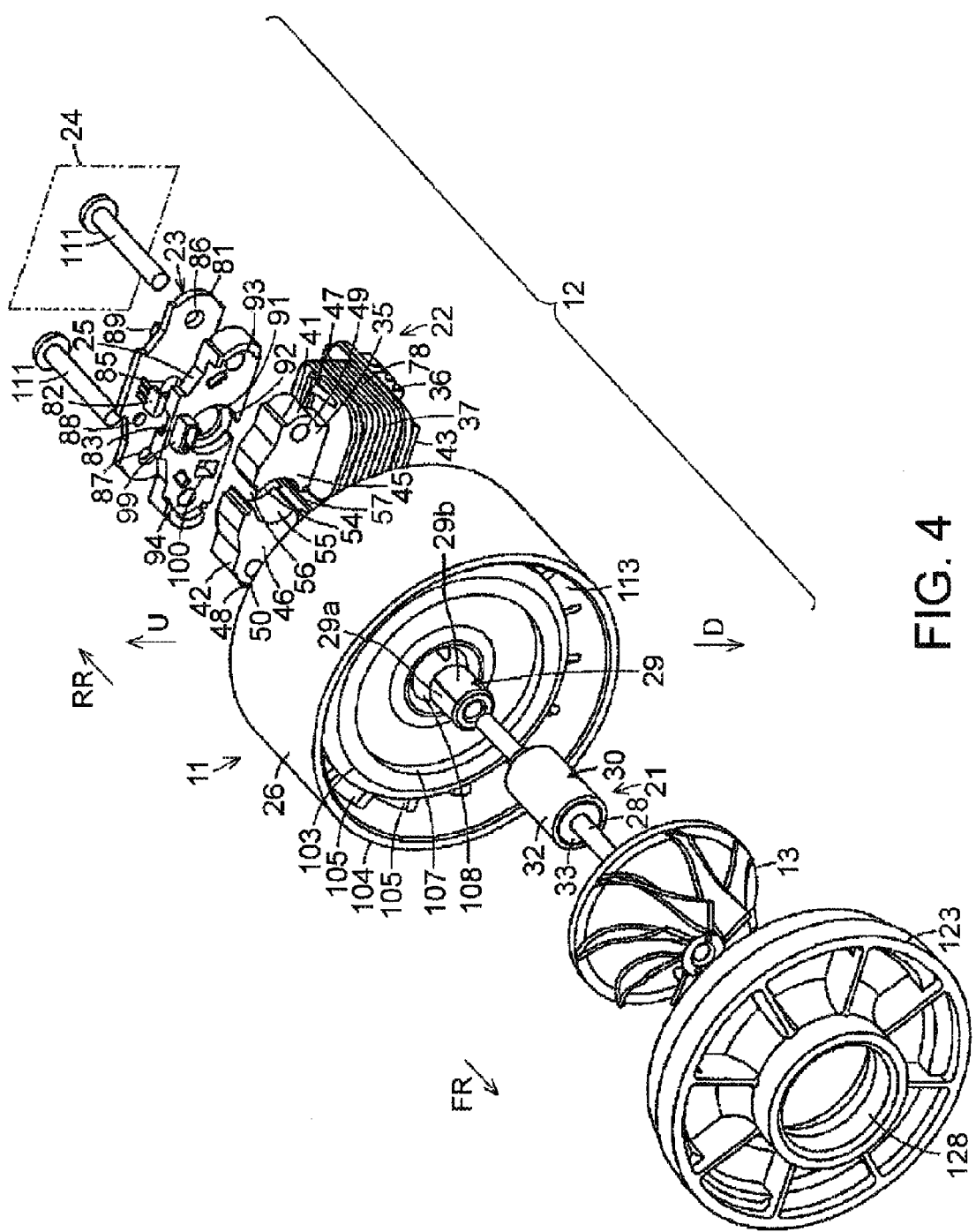
FIG. 4 is an exploded perspective view illustrating the electric blower.

The brushless motor 12 includes, as illustrated in FIGS. 4 to 6, a rotor 21, a stator 22 which generates force of rotating the rotor 21, a detector 23 which detects a rotation position of the rotor 21, a controller 24 which controls the force generated by the stator 22, a fixing member 25 that positions and fixes the stator 22 and the detector 23, and a frame 26 which is a fixing target member (a member to be fixed) used to fix the stator 22 and the detector 23 thereto through the fixing member 25.

The rotor 21 includes a rotation shaft 28 which is an output shaft (a shaft) used to attach the centrifugal fan 13 to one end side (a front end side) thereof, a rotor body 29 which is a magnet portion integrally fixed to the other end side (a rear end side) of the rotation shaft 28, and a bearing portion 30 which holds the rotation shaft 28 to be rotatable at a position of one end side (the front end side) in relation to the rotor body 29.

The rotation shaft 28 is formed into a slender column shape by, for example, metal such as stainless steel.

The rotor body 29 is formed into a cylindrical shape and is fixed to the rotation shaft 28 by, for example, adhering. A permanent magnet (not illustrated) is embedded in the rotor body 29 so that a half of an outer circumference (about a half circumference) becomes, for example, an N (one) magnetic pole 29a and the other half (about a half circumference) becomes an S (the other) magnetic pole 29b. That is, the rotor body 29 includes the pair of magnetic poles 29a and 29b which are formed in the substantially same size and have different polarities while being adjacent to each other in a circumferential direction (a rotation direction).

The bearing portion 30 includes a cylindrical sleeve 32 which is fixed to a frame 26 and bearings 33 and 33 which are fixed to both ends inside the sleeve 32 and the rotation shaft 28 is inserted through these bearings 33 and 33 to be held by these bearings 33 and 33.

The stator 22 includes, as illustrated in FIGS. 1 to 6, a stator core 35 which is formed of, for example, a magnetic body such as an electromagnetic steel plate and an insulation body 36 which is a stator insulator integrally attached to the stator core 35 and a wire 37 such as a copper wire is wound on the insulation body 36.

The stator core 35 is formed in a substantial U shape (a substantial C shape) in such a manner that a connection portion 43 connects one end portions of one and the other core portions 41 and 42 making a pair. The other end portions as free end portions of one and the other core portions 41 and 42 separated from each other are integrally provided with one and the other core tooth portions 45 and 46 forming one and the other magnetic pole portions and swollen portions 47 and 48 serving as positioning portions. Further, the swollen portions 47 and 48 are provided with circular hole-shaped passage holes 49 and 50 which serve as fixing holes for fixing the stator 22 to the frame 26 and penetrate the stator core 35 in a thickness direction (an anteroposterior direction). Hereinafter, a vertical direction and a horizontal direction illustrated in FIG. 1 will be described as a vertical direction (a side near an arrow U and a side near an arrow D) and a horizontal direction (a side near an arrow L and a side near an arrow R) of the electric blower 11 (the brushless motor 12).

One and the other core tooth portions 45 and 46 protrude from the other end portions of the core portions 41 and 42 to face each other (a right side of one core portion 41 and a left side of the other core portion 42). These core tooth portions 45 and 46 respectively include magnetic action faces 54 and 55 which are curved in a circular-arc shape and face each other and are separated from each other in the horizontal direction through slot opening portions 56 and 57 continuous to the magnetic action faces 54 and 55. Further, these core tooth portions 45 and 46 are respectively provided with notch portions 58 and 59 formed above at the opposite side to the connection portion 43.

The magnetic action faces 54 and 55 are portions which apply magnetism for rotating the rotor 21 to the rotor body 29 (the magnetic poles 29*a* and 29*b*) and face the outer circumferential face of the rotor body 29 (the magnetic poles 29*a* and 29*b*) with a predetermined gap interposed therebetween in the horizontal direction. Further, these magnetic action faces 54 and 55 are disposed so that circular-arc center positions are slightly deviated from each other.

Further, the swollen portions 47 and 48 protrude toward the non-opposite sides of the core portions 41 and 42 (a left side of one core portion 41 and a right side of the other core portion 42). These swollen portions 47 and 48 are formed so that outer faces are formed in a circular-arc shape.

The passage holes 49 and 50 are opened to the core portions 41 and 42 to be concentric with the swollen portions 47 and 48.

The insulation body 36 is formed of, for example, synthetic resin having excellent heat resistance and is integrally provided with one and the other winding target portions (portions to be wound) 63 and 64 disposed in the core portions 41 and 42 of the stator core 35, an intermediate holding portion 66, and a holding portion 67.

One and the other winding target portions 63 and 64 include a pair of frame-shaped side plate portions 63*a* and 63*b* and a pair of frame-shaped side plate portions 64*a* and 64*b* which are separated from one another and include winding target main portions 63*c* and 64*c* of angular cylindrical shape which are continuous between the side plate portions 63*a* and 63*b* and between the side plate portions 64*a* and 64*b*. Accordingly, a coil bobbin shape is formed so that the core portions 41 and 42 are inserted thereinto. That is, these winding target portions 63 and 64 are positioned to surround the circumferences of the core portions 41 and 42.

The pair of side plate portions 63*b* and 64*b* is integrally continuous to each other and is located at the connection portion 43. The pair of side plate portions 63*b* and 64*b* is integrally provided with a wall portion 68 which is located at a position between a group of the intermediate holding portion 66 and the holding portion 67 and a group of the winding target portions 63 and 64 and protrudes backward at the rear side of the stator core 35. In the wall portion 68, attachment groove portions 69 and 70 are notched at the side plate portions 63*b* and 64*b* located at both sides of the intermediate holding portion 66.

Figures 2A, 2D:
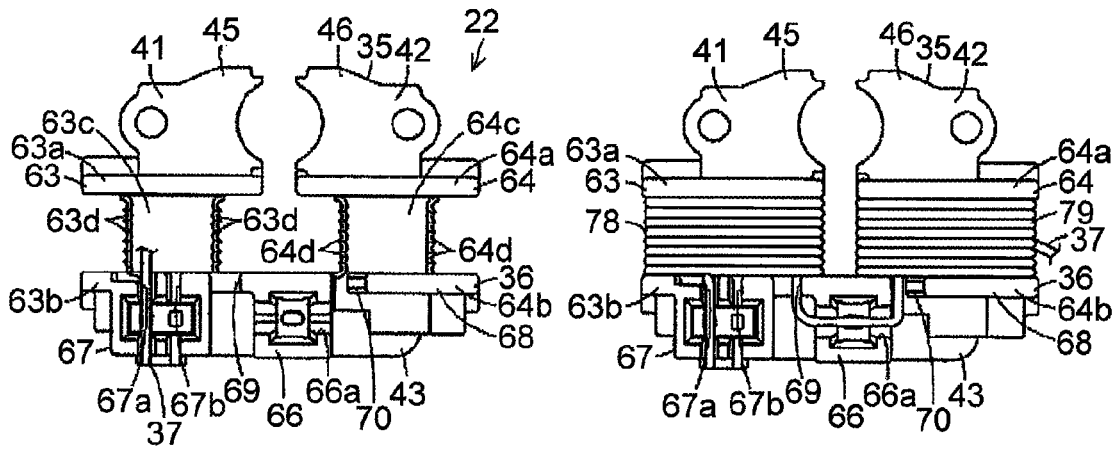
FIG. 2A is a top view illustrating a part of the brushless motor as it appears in a step in a method of manufacturing the part of the brushless motor.
FIG. 2D is a top view illustrating a part of the brushless motor as it appears in a step in a method of manufacturing the part of the brushless motor.

As illustrated in FIG. 2A, a plurality of winding groove portions 63*d* and 64*d* are formed to be adjacent to each other in the vertical direction so that the winding groove portions are respectively formed at both left and right side portions of the winding target main portions 63*c* and 64*c* and regulate a position of the wire 37 in order to easily wind the wire 37 thereon.

The intermediate holding portion 66 is formed into an angular cylindrical shape which has an axial direction following the anteroposterior direction and of which a rear end side is opened, and is located at a substantial center portion of the connection portion 43 of the stator core 35 between the winding target portions 63 and 64 in the horizontal direction. This intermediate holding portion 66 includes a longitudinal intermediate holding groove portion 66*a* which follows the horizontal direction intersecting (orthogonal to) the anteroposterior direction as an axial direction of the brushless motor 12 and holds a part of the wire 37. Then, an intermediate terminal 75 is inserted and attached to the intermediate holding portion 66.

The intermediate terminal 75 is formed by bending a conductive plate-shaped metal member by press-molding or the like, and includes a tongue piece-shaped intermediate insertion portion 75*a* which is inserted into the intermediate holding portion 66 and a tongue piece-shaped intermediate connection portion 75*b* which protrudes from the intermediate holding portion 66 and electrically connected to an external circuit.

The intermediate insertion portion 75*a* is inserted into the intermediate holding portion 66 in a direction from a rear side toward a front side and is located along the vertical direction intersecting (orthogonal to) the intermediate holding groove portion 66*a*. A linear intermediate groove portion 75*c* which communicates with a front end portion of the intermediate insertion portion 75*a* is provided at a center portion of the intermediate insertion portion 75*a* in the vertical direction. Then, intermediate stopper claws 75*d* and 75*d* which prevent the intermediate terminal 75 from being separated from the intermediate holding portion 66 protrude from both upper and lower side portions of the intermediate insertion portion 75*a* (see FIG. 3).

The intermediate stopper claws 75*d* and 75*d* are locked to both upper and lower side portions of the intermediate holding groove portion 66*a* of the intermediate holding portion 66 to prevent the intermediate terminal 75 from being separated backward from the intermediate holding portion 66.

The holding portion 67 is formed into an angular cylindrical shape which has an axial direction following the anteroposterior direction and of which a rear end is opened and is located at the connection portion 43 of the stator core 35 near the winding target portion 63. This holding portion 67 includes first and second holding groove portions 67*a* and 67*b* which have a longitudinal shape following the vertical direction intersecting (orthogonal to) the anteroposterior direction and the horizontal direction and hold a part of the wire 37. Then, a terminal portion 77 is inserted and attached to the holding portion 67.

The terminal portion 77 is formed by bending a conductive plate-shaped metal member by press-molding or the like, and includes a tongue piece-shaped insertion portion 77a which is inserted into the holding portion 67 and a tongue piece-shaped connection portion 77b which protrudes from the holding portion 67 and electrically connected to an external circuit.

The insertion portion 77a is inserted into the holding portion 67 in a direction from a rear side toward a front side and is located along the horizontal direction intersecting (orthogonal to) the holding groove portions 67a and 67b. Linear groove portions 77c and 77d which hold the wire 37 held by the holding groove portions 67a and 67b are provided in parallel to be continuous to a front end portion of the insertion portion 77a. Then, stopper claws 77e and 77e which prevent the terminal portion 77 from being separated from the holding portion 67 protrude from both left and right side portions of the insertion portion 77a.

Protrusion portions 67c and 67d which protrude from a bottom portion of the holding portion 67 are fitted to the groove portions 77c and 77d and the wires 37 and 37 are clamped between the groove portions 77c and 77d and the protrusion portions 67c and 67d.

The stopper claws 77e and 77e are locked to both upper and lower side portions of the holding groove portions 67a and 67b of the holding portion 67 and prevent the terminal portion 77 from being separated backward from the holding portion 67.

The wire 37 is formed by covering a surface of a conductive wire body by, for example, a thin insulation coating (a skin material) of enamel varnish or the like and one end side thereof is multiply wound on one winding target portion 63 of the insulation body 36 in a predetermined uniform direction. The other end side of the wire 37 is multiply wound on the other winding target portion 64 of the insulation body 36 in a predetermined uniform direction, whereby one and the other coils 78 and 79 are formed. An intermediate portion between both end portions of the wire 37 is held by the intermediate holding portion 66 and both end portions are held by the holding portion 67. That is, in the embodiment, both coils 78 and 79 are formed by one wire 37.

One and the other coils 78 and 79 form electromagnets which generate magnetic poles having different polarities in the core tooth portions 45 and 46 (the magnetic action faces 54 and 55) of the stator core 35 and are respectively formed by winding the wire 37 on the winding target portions 63 and 64 in the same direction. Thus, these coils 78 and 79 are electrically connected in parallel between the terminal portion 77 and the intermediate terminal 75, a winding start position of one coil 78 is near the terminal portion 77, and a winding start position of the other coil 79 is near the intermediate terminal 75.

The detector 23 includes a substrate 81 and a position detector 82 and a temperature detector 83 which are mounted on the substrate 81.

The substrate 81 is formed in an elongated plate shape by an insulating member. Here, a circular hole-shaped insertion hole 85 into which the rotation shaft 28 of the rotor 21 is inserted is opened to a center portion of the substrate and circular hole-shaped communication holes 86 and 87 which communicate with the passage holes 49 and 50 provided in the stator core 35 are opened to the vicinity of both end portions thereof in the longitudinal direction. Further, a circular hole-shaped positioning hole 88 for positioning the substrate 81 and the fixing member 25 is opened between the insertion hole 85 and the communication hole 87 in the substrate 81. Then, the position detector 82 and the temperature detector 83 are disposed at the front surface side of the substrate 81 and a terminal base portion 89 which electrically connects the detector 23 and the controller 24 to each other is disposed at the rear surface side of the substrate 81.

The position detector 82 is, for example, a hall IC which detects a rotation position (a rotation angle) of the rotor 21 by detecting the polarities of the magnetic poles 29a and 29b of the rotor body 29 of the rotor 21. In the embodiment, the position detector is a lead component and protrudes from the front surface side of the substrate 81. This position detector 82 is disposed to face the slot opening portion 56 of the stator core 35 and faces the outer circumferential face of the rotor body 29 of the rotor 21 from the slot opening portion 56.

The temperature detector 83 is, for example, a thermistor which detects a temperature of the stator 22 (including the coils 78 and 79). In the embodiment, the temperature detector is a chip component and is mounted on the front surface side of the substrate 81.

The controller 24 which controls force generated by the stator 22 is electrically connected to the detector 23 which detects a rotation position and serves as a current switch which switches a direction of a current flowing to the coils 78 and 79 or energization time in response to the rotation position of the rotor 21 detected by the position detector 82. Here, a rotation speed of the rotor 21 is controlled in accordance with a change in energization time. Further, the controller 24 serves as a protector which protects the stator 22 (including the coils 78 and 79) from overheating by interrupting the current flowing to the coils 78 and 79 when a temperature of the coils 78 and 79 detected by the temperature detector 83 is equal to or higher than a predetermined value. Then, the controller 24 is fixed to a predetermined position other than, for example, the frame 26.

The fixing member 25 is used to position the detector 23 (the substrate 81) and to hold the stator 22 and the detector 23 (the substrate 81) with respect to the frame 26 and is formed into an elongated plate shape substantially having the same outline as the substrate 81 by, for example, insulating synthetic resin or the like. A circular hole-shaped insertion opening portion 91 which coaxially communicates with the insertion hole 85 of the substrate 81 and into which the rotation shaft 28 of the rotor 21 is inserted is opened to a center portion of the fixing member 25. A circular concave portion 92 into which the rear end side of the rotor body 29 of the rotor 21 is fitted in a direction from a front side thereof at a circumferential edge portion of the insertion opening portion 91 is provided at the front surface side of the fixing member 25. Further, circular hole-shaped communication opening portions 93 and 94 which coaxially communicate with the passage holes 49 and 50 and the communication holes 86 and 87 are opened in the vicinity of both end portions of the fixing member 25 in the longitudinal direction. Further, an angular cylindrical positioning portion 99 into which the position detector 82 is held while being inserted protrudes from a position which is a center portion of the front surface side of the fixing member 25 in a longitudinal direction and is above the insertion opening portion 91. Further, the fixing member 25 is provided with an insertion hole 100 opened in an angular hole shape into which the temperature detector 83 of the detector 23 provided in the substrate 81 is inserted and the insertion hole is provided between the insertion opening portion 91 and the communication opening portion 94 to penetrate the fixing member 25 in a thickness direction (an anteroposterior direction). Then, a columnar positioning protrusion portion 101 which is inserted into the positioning hole 88 of the substrate 81 protrudes from a rear surface side of the fixing member 25 (see FIG. 6(b)).

Further, the frame 26 is formed of, for example, synthetic resin or the like and is integrally provided with a frame body 103 which is a columnar fixing target main member, a cylindrical outer wall portion 104 which is located in the periphery of the frame body 103, and a rectifier 105 which is a plurality of rectification fins connecting the frame body 103 and the outer wall portion 104 to each other.

A circular fitting and receiving portion 107 to which the centrifugal fan 13 is fitted is recessed in one end side as the front side of the frame body 103 and a holding hole 108 into which the bearing portion 30 (the sleeve 32) is inserted and fixed is provided at a center portion of the fitting and receiving portion 107 to penetrate both front and rear end portions. Further, boss portions 109 and 110 which serve as screw fixing holes protrude from the other end side as the rear side of the frame body 103 (see FIG. 5). Then, screws 111 and 111 which are fixing members fixing the stator 22 and the detector 23 (the substrate 81) to the frame 26 along with the fixing member 25 are inserted into these boss portions 109 and 110 from a rear side along the axial direction of the frame 26 (the anteroposterior direction) to be threaded thereinto.

The outer wall portion 104 is uniformly separated from the outer circumferential face of the frame body 103 throughout the entire circumference and a flow passage 113 at which the rectifiers 105 are positioned is defined between the inner peripheral face of the outer wall portion 104 and the outer circumferential face of the frame body 103. Then, the other end side as the rear side of the flow passage 113 is formed as an exhaust port 114 from which air blowing from the centrifugal fan 13 is discharged to the outside of the electric blower 11 (the brushless motor 12).

Each rectifier 105 is formed in a rib shape so that air blowing from the centrifugal fan 13 toward the outer peripheral side and passing through the flow passage 113 in a direction from a front side toward a rear side thereof is rectified and is inclined along a circumferential direction of the frame 26 in a direction from a front side toward a rear side.

Meanwhile, the centrifugal fan 13 is integrally fixed to a front end portion of the rotation shaft 28 of the brushless motor 12. The centrifugal fan 13 is formed of, for example, synthetic resin which is excellent in heat resistance, dimensional stability, and wear resistance such as PEEK classified as super engineering plastic or light metal such as aluminum. Here, the centrifugal fan is formed in a cylindrical shape which is gradually enlarged in diameter in a direction from one end portion toward the other end portion and is configured to rectify air in a direction from a center toward an outer circumference by a rotation in one direction. Then, the centrifugal fan 13 is covered by a cover portion 123 integrally fixed to the frame 26.

The cover portion 123 is formed in a substantially flat cylindrical shape (having a short axial dimension). Here, a circular suction port 128 is provided to penetrate a center portion thereof and the centrifugal fan 13 is disposed to be inserted into the suction port 128 with a gap with respect to the outer circumference. Further, a gap is formed between the inner circumference of the cover portion 123 and the outer circumference of the centrifugal fan 13 and the gap is formed as a communication path 129 which communicates the suction port 128 and the flow passage 113 to each other.

Next, a method of manufacturing the embodiment of the brushless motor will be described.

When the electric blower 11 is manufactured, the rotor 21 in which the bearing portion 30, the rotor body 29, and the centrifugal fan 13 are attached to the rotation shaft 28 is attached to the frame 26, the stator 22 and the detector 23 which are separately assembled are attached to the frame 26 along with the fixing member 25, and the cover portion 123 is attached to the frame 26.

When the rotor 21 is assembled, the bearing portion 30 in which the bearings 33 and 33 are fixed into the sleeve 32 by, for example, adhering are formed, the rotation shaft 28 is inserted into the bearings 33 and 33 of the bearing portion 30, the rotor body 29 is fixed to the rear end side of the rotation shaft 28 by, for example, adhering, and the centrifugal fan 13 is fixed to the rotation shaft 28 by an adhesive or the like.

Figures 2B, 2E:
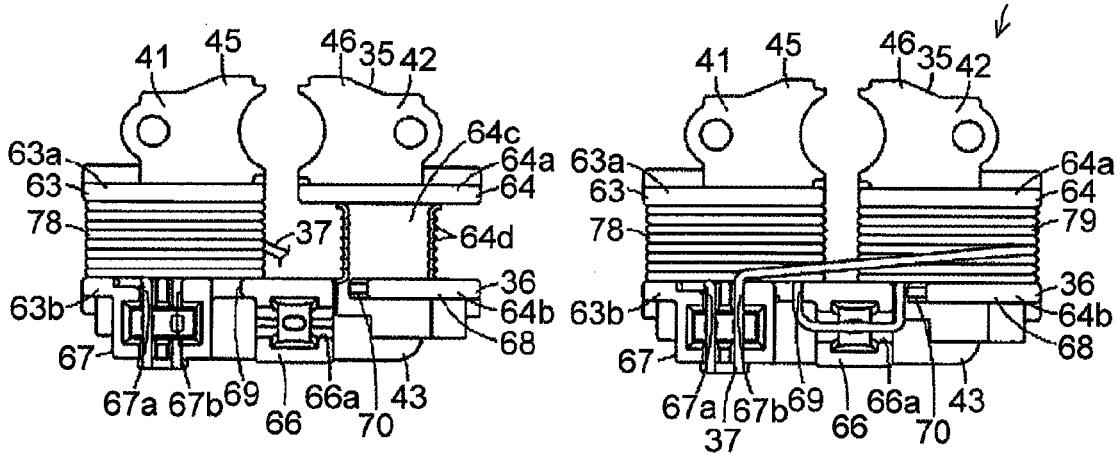
FIG. 2B is a top view illustrating a part of the brushless motor as it appears in a step in a method of manufacturing the part of the brushless motor.
FIG. 2E is a top view illustrating a part of the brushless motor as it appears in a step in a method of manufacturing the part of the brushless motor.

Further, when the stator 22 is assembled, one end portion of the wire 37 is first held while being fitted to the holding groove portion 67a of the holding portion 67 of the insulation body 36 integrally attached to the stator core 35 and is drawn toward one winding target portion 63 of the insulation body 36 (FIG. 2A) and one end side of the wire 37 is wound on the winding target portion 63 in a uniform direction while the wire 37 is tensioned (FIG. 2B). At this time, the wire 37 is sequentially wound on the winding target main portion 63c of the winding target portion 63 from one end portion (a lower end portion) toward the other end portion (an upper end portion) while both side portions are fitted to the winding groove portion 63d. Next, the wire is wound on the wound wire 37 from the other end portion (the upper end portion) toward one end portion (the lower end portion) and further wound thereon from one end portion toward the other end portion. In this way, when this coiling operation is sequentially repeated, the wire can be wound multiply. Then, one coil 78 is formed when the wire 37 is wound on the winding target portion 63 a predetermined number of times.

Figure 2C:
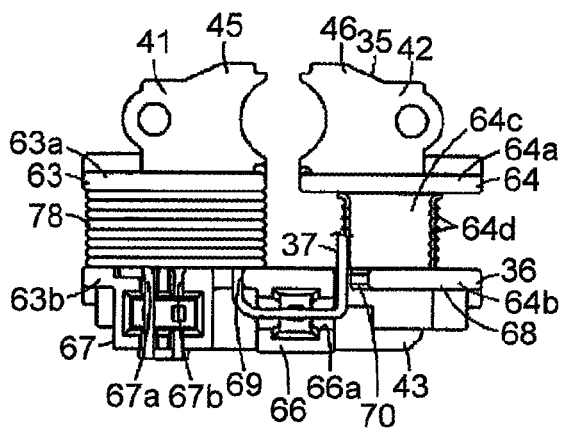
FIG. 2C is a top view illustrating a part of the brushless motor as it appears in a step in a method of manufacturing the part of the brushless motor.

A winding end position of the wire 37 of one coil 78 is continuously drawn out from one attachment groove portion 69 toward the intermediate holding portion 66, is inserted and fitted to the intermediate holding groove portion 66a of the intermediate holding portion 66, and is derived from the other attachment groove portion 70 toward the other winding target portion 64 (FIG. 2C). Then, the wire is uniformly wound on the other winding target portion 64 in the same direction as one winding target portion 63 (FIG. 2D). At this time, the wire 37 is wound on the winding target main portion 64c of the other winding target portion 64 from one end portion (the lower end portion) toward the other end portion (the upper end portion) similarly to one winding target portion 63 so that the wire is sequentially wound while both side portions thereof are fitted to the winding groove portion 64d. Next, the wire is multiply wound from the other end portion (the upper end portion) toward one end portion (the lower end portion) and is further wound from one end portion toward the other end portion. In this way, this coiling operation is sequentially repeated. Then, the other coil 79 is formed when the wire 37 is wound on the winding target portion 64 a predetermined number of times.

Next, the other end side of the wire 37 is pulled toward one coil 78 and is drawn from the holding groove portion 67b toward the holding portion 67 to be held therein (FIG. 2E) and the wire 37 is cut.

Figure 3A:
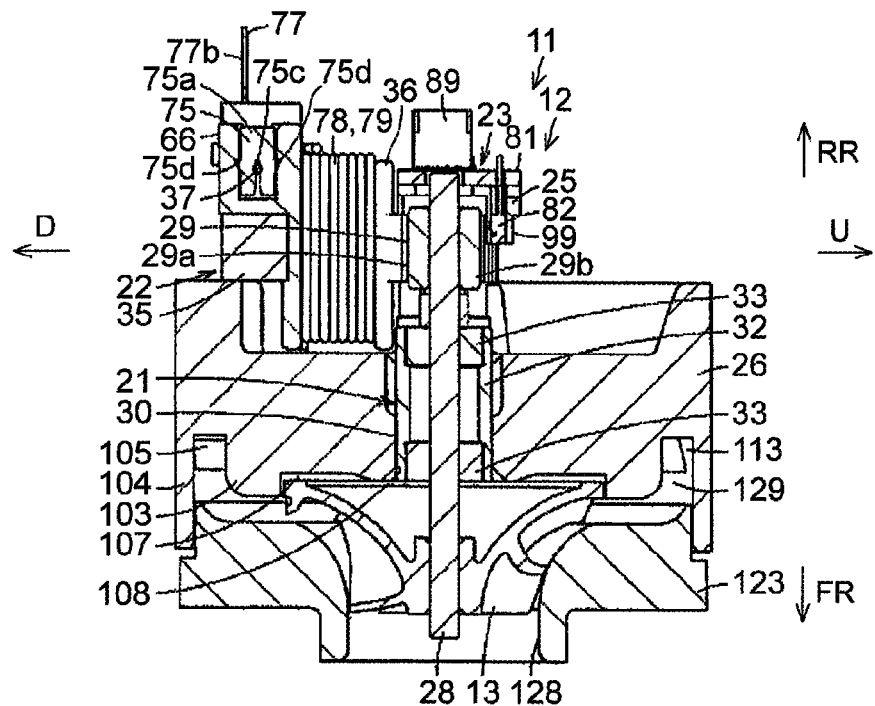
FIG. 3A is a cross-sectional view taken along the positions of an intermediate holding portion and an intermediate terminal of an electric blower including the brushless motor.

In this state, as illustrated in FIG. 3A, when the intermediate insertion portion 75a of the intermediate terminal 75 is press-inserted to the intermediate holding portion 66, the wire 37 held by the intermediate holding groove portion 66a of the intermediate holding portion 66 is fitted to the intermediate groove portion 75c of the intermediate terminal 75 and the wire 37 relatively slides along the intermediate groove portion 75c. At this time, since the width of the intermediate groove portion 75c is slightly smaller than that of the wire 37, the insulation coating of the wire 37 is damaged by the intermediate groove portion 75c and thus a conductive wire body of the wire 37 contacts the intermediate terminal 75. Next, when the intermediate terminal 75 is further pressed, the wire 37 is held by the intermediate groove portion 75c to be electrically connected to the intermediate terminal 75 and the intermediate stopper claws 75d and 75d are locked to both side portions so that the intermediate terminal 75 is fixed to the intermediate holding portion 66. Thus, the intermediate terminal 75 is fixed to the intermediate holding portion 66 while the intermediate terminal 75 is electrically connected to the center portion between both ends (a winding end position of one coil 78 and a winding start position of the other coil 79) of the wire 37.

Figure 1:
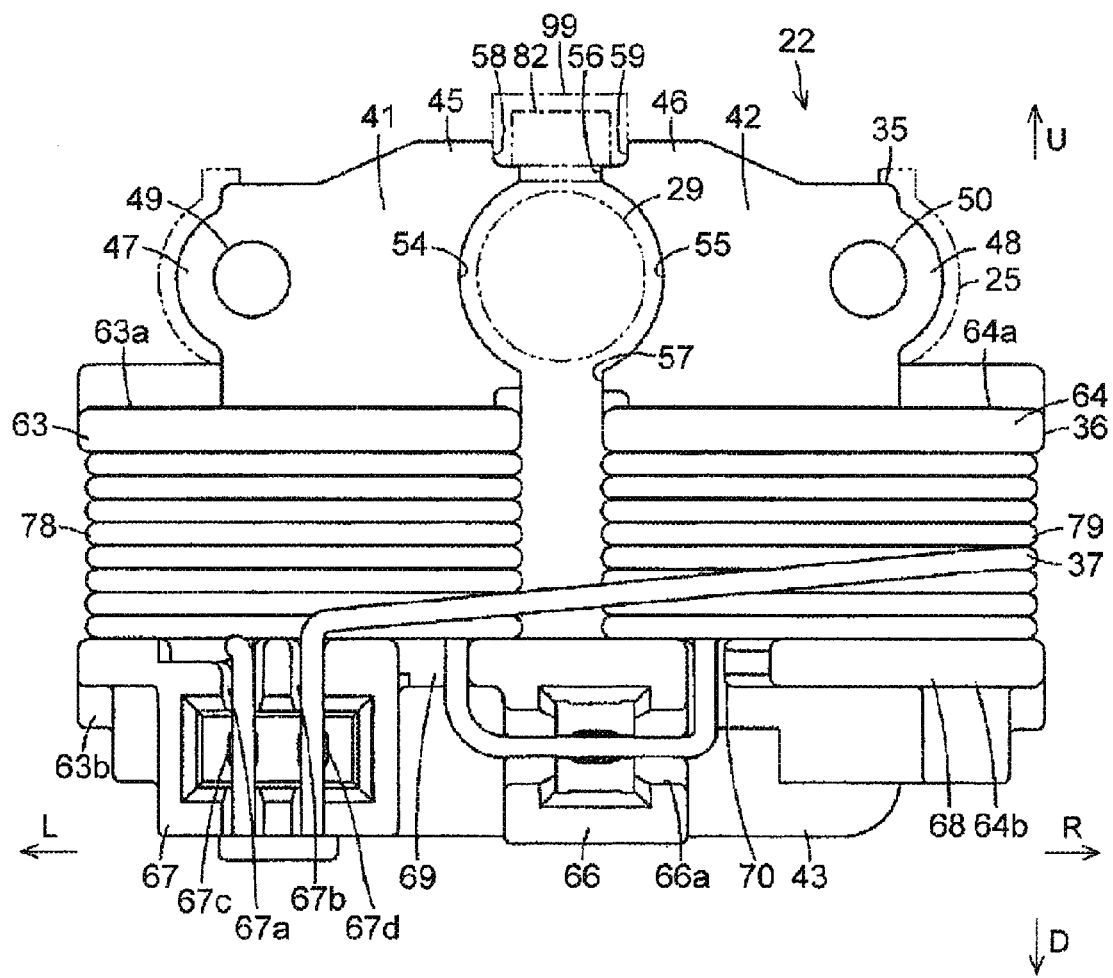
FIG. 1 is a top view illustrating a part of a brushless motor of an embodiment.
Figure 3B:
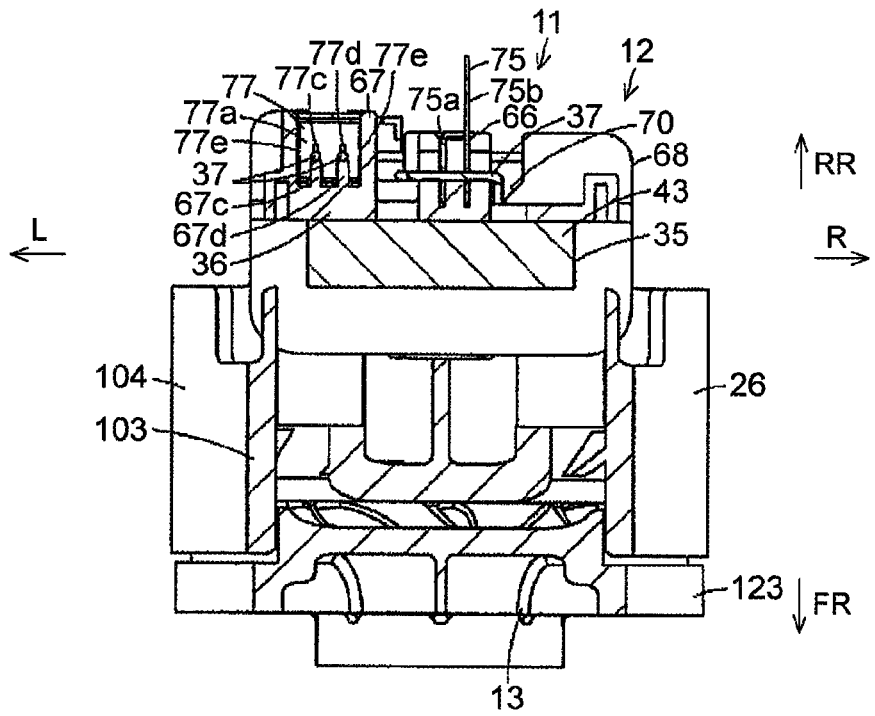
FIG. 3B is a cross-sectional view taken along the positions of a holding portion and a terminal portion of the electric blower.

Similarly, as illustrated in FIG. 3B and FIG. 1, when the terminal portion 77 is press-inserted into the holding portion 67, the wires 37 held by the holding groove portions 67a and 67b of the holding portion 67 are fitted to the groove portions 77c and 77d of the terminal portion 77 and the wires 37 relatively slide along the groove portions 77c and 77d. At this time, since the width of each of the groove portions 77c and 77d is slightly smaller than that of the wire 37, the insulation coating of the wire 37 is damaged by each of the groove portions 77c and 77d and thus the conductive wire body of the wire 37 contacts the terminal portion 77. Next, when the terminal portion 77 is further pressed, the wires 37 and 37 are held by the groove portions 77c and 77d to be electrically connected to the terminal portion 77 and the protrusion portions 67c and 67d are fitted to the groove portions 77c and 77d to clamp the wires 37. Also, the stopper claws 77e and 77e are locked to both side portions and thus the terminal portion 77 is fixed to the holding portion 67. Thus, the terminal portion 77 is fixed to the holding portion 67 while the terminal portion 77 is electrically connected to both end portions (a winding start position of one coil 78 and a winding end position of the other coil 79) of the wire 37, thereby completing the stator 22.

Next, the rotor 21 and the stator 22 which are completed in this way are assembled to the frame 26. In the rotor 21, when the bearing portion 30 is fixed into the holding hole 108 by adhering while being inserted thereinto and the cover portion 123 is fixed to the frame 26 by adhering, the centrifugal fan 13 is located at the fitting and receiving portion 107 of the frame 26 and is inserted into the suction port 128 so that the suction port 128 and the flow passage 113 communicate with each other by the communication path 129.

Further, when the stator 22 and the detector 23 are fixed to the frame 26, the positioning protrusion portion 101 which protrudes from the rear surface side of the fixing member 25 is positioned to the positioning hole 88 of the substrate 81 of the detector 23. Then, when the position detector 82 mounted on the substrate 81 is positioned to the positioning portion 99 of the fixing member 25 and the front surface side of the substrate 81 is overlapped with the rear surface side of the fixing member 25, the position detector 82 is held while being inserted into the positioning portion 99 and the temperature detector 83 is inserted into the insertion hole 100 of the fixing member 25 (see FIGS. 6 and 4).

Next, when the front surface side of the fixing member 25 overlapped with the detector 23 is positioned to the rear side of the stator core 35 of the stator 22 to be overlapped therewith, the insertion hole 85 of the substrate 81, the insertion opening portion 91 of the fixing member 25, and a gap between the core tooth portions 45 and 46 of the stator core 35 (a gap between the magnetic action faces 54 and 55) are located to be coaxial. Further, the communication holes 86 and 87 of the substrate 81 and the communication opening portions 93 and 94 of the fixing member 25 are located to be coaxial with the passage holes 49 and 50 of the stator core 35, the positioning portion 99 is fitted between the notch portions 58 and 59, and the position detector 82 is directed from the slot opening portion 56 toward the magnetic action faces 54 and 55. Further, the temperature detector 83 is accommodated inside a closed space (not illustrated) which is surrounded by the substrate 81, the insertion hole 100, and the stator core 35 so that air does not pass therethrough and the temperature detector faces the stator core 35 at a position separated from the stator core 35.

Then, when the stator 22 and the detector 23 are overlapped with the rear side of the frame 26 along with the fixing member 25, the communication holes 86 and 87, the communication opening portions 93 and 94, and the passage holes 49 and 50 are positioned to the boss portions 109 and 110, the screws 111 and 111 are inserted into the communication holes 86 and 87, the communication opening portions 93 and 94, the passage holes 49 and 50, and the boss portions 109 and 110 from a rear side, and the screws 111 and 111 are threaded into the boss portions 109 and 110, the stator 22 and the detector 23 are fixed to the frame 26 through the fixing member 25.

In this state, the rear end side of the rotor body 29 of the rotor 21 is fitted into the concave portion 92 and the outer circumferential face (the magnetic poles 29a and 29b) of the rotor body 29 is disposed between the core tooth portions 45 and 46 (the magnetic action faces 54 and 55) with a predetermined gap interposed therebetween to be positioned to the position detector 82 while facing the position detector.

When the electric blower 11 completed in this way is assembled to a predetermined position and a lead wire or the like is electrically connected to the intermediate connection portion 75b of the intermediate terminal 75 and the connection portion 77b of the terminal portion 77, electric power is supplied thereto so that the electric blower is rotatable.

In the detector 23, the position detector 82 detects the rotation position of the rotor 21, that is, the rotation positions of the magnetic poles 29a and 29b through the magnetic poles 29a and 29b. Then, when a direction in which a current flows to the coils 78 and 79 is switched in response to the rotation position by the controller 24, a magnetic pole generated in the core tooth portions 45 and 46 (the magnetic action faces 54 and 55) is switched so that the rotor 21 is rotated.

More specifically, if the controller 24 sets a direction in which a current flows to the wire 37 so that the same polarity (N pole) as the magnetic pole 29a is generated in one coil 78 and the same polarity (S pole) as the magnetic pole 29b is generated in the other coil 79 when the rotation position of the rotor 21 detected by the position detector 82 is located at a position, for example, in which the magnetic pole 29a faces one core tooth portion 45 (one magnetic action face 54) and the magnetic pole 29b faces the other core tooth portion 46 (the other magnetic action face 55), repulsive force is generated between the core tooth portion 45 (the magnetic action face 54) and the magnetic pole 29a and between the core tooth portion 46 (the magnetic action face 55) and the magnetic pole 29b and attractive force is generated between the core tooth portion 45 (the magnetic action face 54) and the magnetic pole 29b and between the core tooth portion 46 (the magnetic action face 55) and the magnetic pole 29a, whereby the rotor 21 rotates by about a half revolution. Next, when the controller 24 switches a current direction to an opposite direction, magnetic poles which are opposite to the description above are generated in the coils 78 and 79 and thus the rotor 21 further rotates by about a half revolution, whereby the rotor rotates by one revolution. When the operations are repeated, the rotor 21 can be continuously rotated in a uniform direction.

When the centrifugal fan 13 integrally fixed to the rotation shaft 28 of the rotor 21 rotates by the rotation of the rotor 21, a negative pressure is generated and thus air is suctioned from the suction port 128. This air flows from the communication path 129 to the flow passage 113 while being rectified along the centrifugal fan 13. When this air passes through the flow passage 113, the air is rectified by the rectifiers 105 and is used to cool the brushless motor 12. Then, the air is discharged from the exhaust port 114.

Besides, the temperature detector 83 accommodated inside the closed space detects a temperature of each of the coils 78 and 79, that is, a temperature of the stator 22 through the stator core 35. Then, the controller 24 determines whether the corresponding temperature is equal to or higher than a predetermined temperature and determines that the coil 78 and (or) the coil 79 is overheated when the temperature is equal to or higher than the predetermined temperature. Then, the controller 24 decreases the amount of a current flowing to the coils 78 and 79 and stops the rotation of the rotor 21 to protect the electric blower 11 (the brushless motor 12).

In this way, according to the above-described embodiment, it is possible to continuously wind one wire 37 between one coil 78 and the other coil 79 without separately processing the end portion of the wire 37 in each of the coils 78 and 79 when the stator 22 is assembled. That is, since there is no need to perform a process of cutting or soldering the terminal of the wire 37 in each of the coils 78 and 79 the number of times of processing the terminal can be decreased. Thus, reliability can be improved, manufacturing time can be shortened, manufacturability can be improved, and manufacturing cost can be suppressed.

According to the embodiment, it is possible to provide the brushless motor which is improved in reliability and manufacturability and the method which manufactures the brushless motor.

Further, the intermediate portion and both end portions of the coils 78 and 79 of the wire 37 can be easily electrically connected to the terminals only by an operation in which the intermediate terminal 75 and the terminal portion 77 are inserted into the intermediate holding portion 66 holding the intermediate portion of the wire 37 and the holding portion 67 holding both end portions of the wire 37. Accordingly, since a process such as soldering is not needed, the terminal is easily processed and thus reliability and manufacturability can be further improved.

Moreover, since the intermediate holding portion 66 and the holding portion 67 are provided with the intermediate holding groove portion 66a and the holding groove portions 67a and 67b which hold the wire 37, it is possible to further reliably hold the intermediate portion or both end portions of the wire 37 and thus to smoothly perform a coiling operation.

Further, in the embodiment, the brushless motor 12 can be also applied to an arbitrary electric device other than the electric blower 11.

While the embodiment of the invention has been described, the embodiment is merely an example and does not limit the scope of the invention. As a novel embodiment, various other embodiments can be considered and various omissions and substitutions can be made without departing from the spirit of the invention. The embodiment or the modification thereof is included in the scope or the spirit of the invention and is included the invention of claims and the equivalent scope thereof.

What is claimed is:

1. A brushless motor comprising:
   a rotor which has a magnet portion with magnetic poles having different polarities in a rotation direction;
   a stator which generates force of rotating the rotor;
   a position detector which detects a rotation position of the magnetic poles; and
   a controller which controls force generated by the stator in response to the rotation position of the magnetic poles detected by the position detector,
   wherein the stator includes:
      a stator core which includes one and the other magnetic pole portions disposed to face each other with the magnet portion interposed therebetween;
      an insulation body which includes one and the other winding target portions located at the one and the other magnetic pole portions of the stator core, an intermediate holding portion located between the one and the other winding target portions, and a holding portion, and the insulation body is attached to the stator core;
      a wire of which one end side is wound on the one winding target portion and the other end side is wound on the other winding target portion to form one and the other coils generating magnetic poles having different polarities in the one and the other magnetic pole portions of the stator core and of which both end portions are respectively held by the holding portion and an intermediate portion of the one and the other coils is held by the intermediate holding portion;
      an intermediate terminal which is attached to the intermediate holding portion to be electrically connected to the wire; and
      a terminal portion which is attached to the holding portion to be electrically connected to both end portions of the wire.

2. A method of manufacturing a brushless motor including a rotor which has a magnet portion with magnetic poles having different polarities in a rotation direction, a stator which generates force of rotating the rotor, position detector which detects a rotation position of the rotor, and a controller which controls force generated in the stator in response to a rotation position of the magnet portion detected by the position detector,
   the stator including a stator core formed by a magnetic body with one and the other magnetic pole portions disposed to face each other with the magnet portion interposed therebetween, one and the other winding target portions located at the one and the other magnetic pole portions of the stator core, an intermediate holding portion located between the one and the other winding target portions, a holding portion, an insulation body attached to the stator core, a wire forming one and the other coils generating magnetic poles having different polarities in the one and the other magnetic pole portions of the stator core, an intermediate terminal attached to the intermediate holding portion, and a terminal portion attached to the holding portion, the method of manufacturing the brushless motor comprising:

holding one end portion of the wire by the holding portion;

winding one end side of the wire on the one winding target portion to form the one coil;

holding the other side of the one coil of the wire by the intermediate holding portion;

winding the other end side of the wire in relation to the intermediate holding portion on the other winding target portion to form the other coil;

holding the other end portion of the wire by the holding portion; and attaching the intermediate terminal to the intermediate holding portion to electrically connect the intermediate terminal to the wire and attaching the terminal portion to the holding portion to electrically connect the terminal portion to both end portions of the wire.

* * * * *